Nov. 22, 1949

P. S. DICKEY 2,489,123

PRESSURE RESPONSIVE MECHANISM FOR
PRESSURE MEASURING APPARATUS
Filed June 18, 1945

INVENTOR.
PAUL S. DICKEY
BY
Raymond D. Jenkins
ATTORNEY

Patented Nov. 22, 1949

2,489,123

UNITED STATES PATENT OFFICE 2,489,123

PRESSURE RESPONSIVE MECHANISM FOR PRESSURE MEASURING APPARATUS

Paul S. Dickey, East Cleveland, Ohio, assignor to Bailey Meter Company, a corporation of Delaware Application June 18, 1945, Serial No. 600,175

3 Claims. (Cl. 137—153)

This invention relates to pressure responsive mechanism for pressure measuring apparatus and particularly to apparatus useful in measuring the value of fluid pressures. Such pressures may be considered as differential pressures because even when the value of a negative or of a positive static pressure is to be determined it is desirably with reference to the pressure of the ambient atmosphere. Positive and/or negative pressures other than that of the atmosphere are often desirably to be compared. Differential pressures across an orifice or other restriction to fluid flow bear a known relation to the rate of fluid flow through the orifice. It is apparent then that all measurements of fluid pressure are in fact a comparison of pressures, or in other words a measurement of a differential pressure. By pressure differentials then I mean any two pressures of which one may be the pressure of the atmosphere.

Numerous types of pressure differential measuring apparatus are known, such as Bourdon tubes, liquid sealed U-tube manometers, diaphragms, bellows, etc. My invention is directed to improvements in expansible contractible chambers such as may be formed with a bellows or diaphragm comprising a movable wall or walls of the chamber. The movement or position of such a wall is in part resisted by the inherent spring characteristics of the wall, and in part by additional loading as may be accomplished by springs or other known means.

Such pressure responsive apparatus is designed to have a maximum movement or change in position for a maximum change in differential pressure. If the differential pressure applied to the chamber is greater than the design maximum, then there is danger of distortion or rupture of the chamber. For example, a bellows may be well able to withstand a difference of 50 p. s. i. pressure between the inside and the outside, but if subjected to a difference amounting to 75 p. s. i. the bellows shape may be permanently distorted, or the bellows wall may in fact be ruptured, and thus ruined. The same is of course true of diaphragms whether they be of metal, leather, impregnated cloth, rubber or other common diaphragm material. It is then a particular object of my present invention to provide a construction such that the application of excessive pressures to an expansible chamber of the type disclosed will not damage the same.

A specific object of the invention is to provide a construction arranged to relieve or reduce the differential pressure across a diaphragm or bellows when the differential pressure exceeds a predetermined value, and particularly wherein the relieving means functions upon movement of the bellows or diaphragm beyond a predetermined position as indicative of the application thereto of an excessive differential pressure.

I have chosen to illustrate and describe my invention as applied to a bellows type pressure responsive device useful in measuring the differential pressure across an orifice or other restriction in a conduit through which a fluid is flowing and wherein such differential pressure bears a known relation to the rate of flow of fluid through the orifice.

Figures 1, 2:
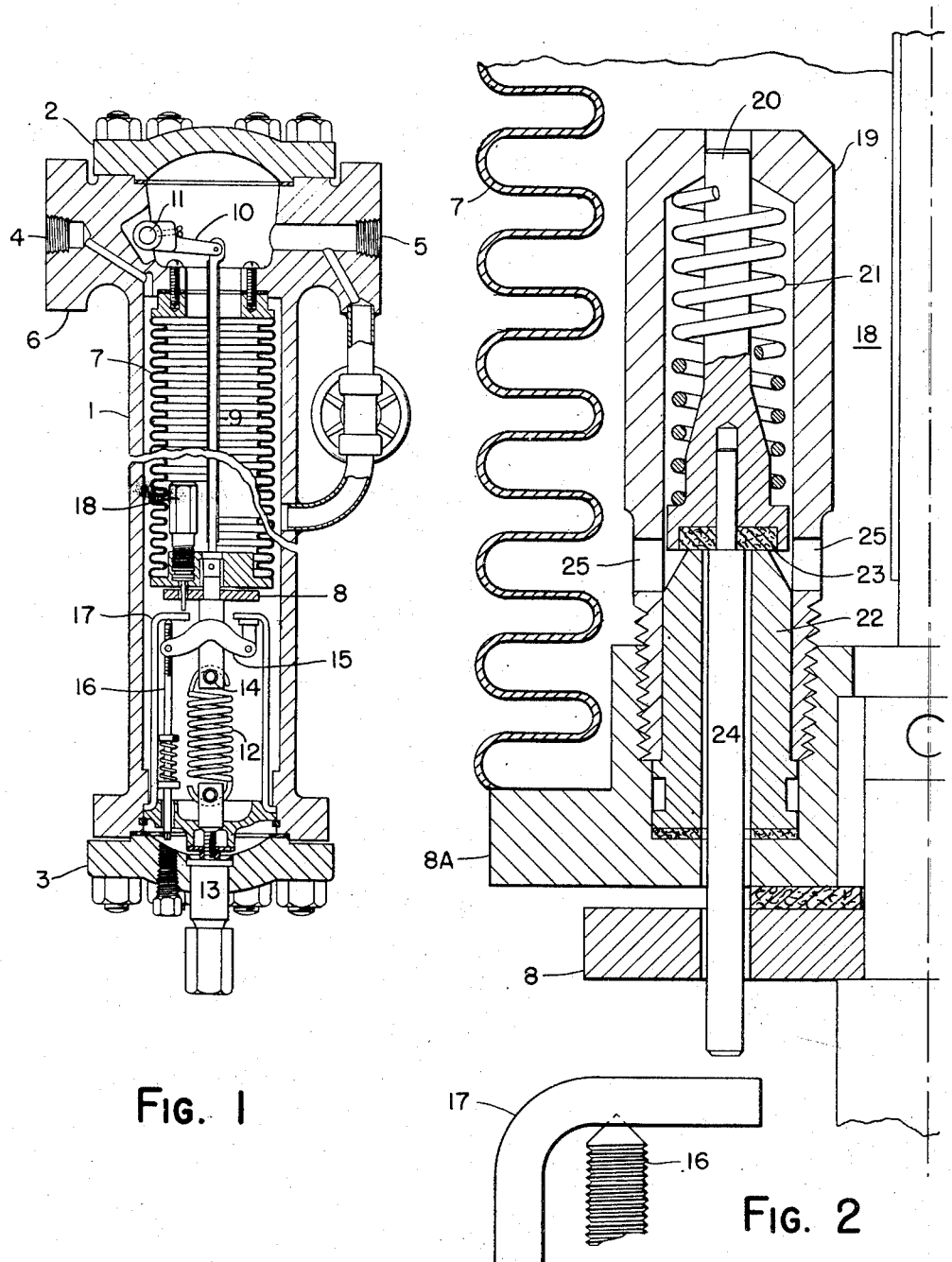
Fig. 1 is a sectional elevation of the assembled measuring apparatus.
Fig. 2 is an enlargement of a portion of Fig. 1 embodying my invention.

In Fig. 1 I show a cylindrical pressure casing 1 with movable top and bottom covers 2 and 3 respectively, having a high pressure inlet 4 and a low pressure inlet 5 within the head 6, and adapted to contain a bellows 7. The bellows 7 is preferably of stainless steel and is of such length and flexibility as to produce a motion of a desired amount minimizing possible errors and avoiding multiplying linkage. The bellows is suspended from the head 6 by having one end rigidly fastened thereto. The movable lower end of the bellows 7 is closed by a head block 8A and a plate 8. A movement of the closed lower end will occur then upon admission to the interior and exterior of the bellows of pressures taken at predetermined points, for example, across an orifice placed in a fluid flow line (not shown). Preferably the low pressure is applied to the interior of the bellows through the opening 5, while a higher pressure is applied to the exterior of the bellows through the opening 4. I prefer this arrangement because a bellows of this type has a greater collapsing strength with the higher of the two pressures applied externally than if the higher of the two pressures is applied internally.

For providing a useful or visual manifestation of the measurement of the differential pressure I transmit the motion of the movable lower end of the expansible contractible chamber to the exterior of the pressure casing 1. Such motion is transmitted by means of a link 9 extending through the bellows 7 and pivotally connected to the head block 8A and to an arm 10 secured to a spindle 11. The spindle 11 protrudes through the wall of the pressure casing 1 at one or both ends through pressure tight bearings (not herein shown), but which are preferably of the type shown in Patent 2,042,166 to F. A. Barnes. Angular motion of the spindle 11 exterior of the casing 1 may be used to position an indicating pointer or a recording pen, or in any desired manner to provide either a visual indication or other useful manifestation of the differential pressure existing across the bellows 7, and of which the position of the movable lower end of the bellows is representative.

In addition to the inherent spring characteristics of the bellows 7 I oppose movement of the bellows by means of a tension spring 12 provided at its lowermost end with means 13 for varying its initial tension exteriorly of the pressure chamber 1. The other end of the spring 12 is hooked over a cross bar 14 in an extension of the member 9. Upward motion of the system comprising the elements 9, 8, 14, 12 is limited by contact of the cross bar 14 with a yoke 15 which straddles the extension of the member 9. Adjustment of the yoke 15 is provided through a screw 16 the upper end of which seats in a U-shaped straddle housing 17 having an opening through which the extension of member 9 freely passes.

Motion of the lower end of the bellows is mechanically limited in downward travel by contact of the plate 8 with the structure 17 and in upward travel by having the cross bar 14 engage the yoke 15. The mere fact that travel of the lower end is mechanically limited in either direction does not protect the bellows 7 from damage or rupture if the bellows is subjected to an excessive difference in pressure within and without thereof. An important feature of my present invention lies in the provision of means for relieving the pressure difference between the interior and exterior of the bellows 7 when such pressure difference exceeds a predetermined maximum value.

Formed in and carried by the head block 8A is a protective valve 18 shown to larger scale in Fig. 2. Threaded into the head block 8A is a housing 19 containing a cylindrical valve member 20 and loading spring 21 normally urging the valve member 20 in a downward direction against a seat 22. Contacting the seat member 22 is a fibre or similar seat gasket 23 through which passes a reduced area extension of a valve rod 24, the lowermost end of which extends through the head block 8A and the plate 8 for possible contact with the structure 17. Through the housing 19 are one or more openings 25 communicating between the interior of the housing 19 and the interior of the bellows 7.

Assuming that an excessive pressure differential is experienced across the wall of the bellows 7 with the maximum pressure experienced within the bellows, the lower end of the bellows is moved downwardly until the valve rod 24 encounters the structure 17. Continued downward movement forces the valve rod 24, the seat material 23 and the portion 20 upwardly against the compression spring 21, thus raising the material 23 off the valve seat 22 and allowing pressure within the bellows 7 to pass through the opening 25, around the valve rod 24 and to the exterior of the bellows 7 within the casing 1. Such action relieves the excessive pressure within the bellows 7 before rupture or damage to the bellows can be experienced.

If the excessive differential pressure across the bellows 7 has the greater of the two pressures acting on the exterior of the bellows 7 the tendency will be to move the assembly 8, 8A, 18 upwardly until the cross bar 14 encounters the yoke 15. At the same time the excessive pressure is effective around the valve stem 24 upon the valve material 23 against the spring 21, causing the assembly 20, 23, 24 to move upwardly unseating the valve material 23 from the valve seat 22 and relieving pressure from the exterior of the bellows 7 to within the interior through the opening 25.

It will thus be seen that if the excessive pressure is within the bellows 7 the action of the valve device 18 is mechanical in nature to relieve the excessive pressure differential across the wall of the bellows 7, whereas if the excessive pressure is on the outside of the wall 7, then the pressure itself unseats the valve member 20 for relief of the excessive pressure differential.

In practice the possibility of the application of an excessive differential pressure across the wall of the bellows 7 occurs if one or the other of the connecting pipes 4 or 5 springs a leak or is ruptured, wherein the pressure in that connection is reduced towards atmospheric in value. For example, such an instrument may be used to measure the rate of flow of a fluid through a conduit under a static pressure of 500 p. s. i. The orifice may be designed for a maximum differential of 5 p. s. i. at maximum rate of fluid flow. Thus under normal operating conditions both the interior and the exterior of the bellows 7 would be subjected to around 500 p. s. i., whereas the maximum differential expected across the wall of the bellows would be 5 p. s. i. If one of the connecting pipes were to spring a leak or become ruptured the tendency would be for the pressure within said pipe to reduce toward atmospheric and thus the bellows might be subjected to a pressure differential approaching 500 p. s. i. Through the agency of my invention such excessive differential pressure would be relieved across the wall of the bellows to prevent damage thereto. Such relief is accomplished entirely automatically, in one direction by the action of fluid pressure, and in the other direction by mechanical means made effective by the excessive fluid pressure.

What I claim as new, and desire to secure by Letters Patent of the United States, is:

1. A pressure responsive mechanism for pressure measuring apparatus comprising, in combination, a casing, a bellows arranged within said casing and subjected on its opposite surfaces to different pressures, said bellows having one of its ends fixed to said casing and its other end movable within said casing, a valve device controlling communication between opposite surfaces of said bellows for limiting differential pressures acting on the latter, means for transmitting motion of the movable end of said bellows to the exterior of said casing, said last mentioned means including a link extending through said bellows and connected to the movable end of the latter, said link having an extension passing through the movable end of said bellows, abutment means supported by said casing and engageable by the movable end of said bellows for limiting expansion of the latter, a member pivotally connected at one end to said abutment means, means for adjustably supporting the other end of said member, and a cross-bar carried by said link extension and engageable with said member for limiting contraction of said bellows.

2. A pressure responsive mechanism for pressure measuring apparatus comprising, in combination, a casing, a bellows arranged within said casing and subjected on its opposite surfaces to different pressures, said bellows having one of its ends fixed to said casing and its other end movable within said casing, a valve device controlling communication between opposite surfaces of said bellows for limiting differential pressures acting on the latter, said valve device including a valve, a valve stem engageable with abutment means for unseating said valve on predetermined expansion of said bellows, and a valve surface subjected to the pressures at the exterior of said bellows for effecting an unseating of said valve when the exterior pressure exceeds the interior pressure by a predetermined amount, means for transmitting motion of the movable end of said bellows to the exterior of said casing, said last mentioned means including a link extending through said bellows and pivotally connected to the movable end of the latter, said link having an extension passing through the movable end of said bellows, abutment means supported by said casing and engageable by said valve stem and by the movable end of said bellows for limiting expansion of the latter, a yoke pivotally connected at one end to said abutment means and straddling the extension of said link, means for adjustably supporting the other end of said yoke, and a cross-bar carried by said link extension and engageable with said yoke for limiting the contraction of said bellows.

3. A pressure responsive mechanism for pressure measuring apparatus comprising, in combination, a casing, a bellows arranged within said casing and subjected on its opposite surfaces to different pressures, said bellows having one of its ends fixed to said casing and its other end movable within said casing, a valve device controlling communication between opposite surfaces of said bellows for limiting differential pressures acting upon the latter, means including a link operatively connected to the movable end of said bellows for transmitting motion of the latter to the exterior of said casing, abutment means supported by said casing and engageable by the movable end of said bellows for limiting expansion of the latter, a member pivotally connected at one end to said abutment means, means for adjustably supporting the other end of said member, and means operatively connected to the movable end of said bellows and engageable with said member for limiting contraction of said bellows.

PAUL S. DICKEY.

REFERENCES CITED

The following references are of record in the file of this patent:

UNITED STATES PATENTS

| Number | Name | Date |
|---|---|---|
| 444,911 | Yont | Jan. 20, 1891 |
| 1,026,324 | Ledoux | May 14, 1912 |
| 1,546,602 | Morrison | July 21, 1925 |
| 1,923,585 | Reeves | Aug. 10, 1933 |
| 2,000,308 | Von Schutz | May 7, 1935 |
| 2,301,031 | Ferguson | Nov. 3, 1942 |
| 2,384,169 | Huck | Sept. 4, 1945 |

FOREIGN PATENTS

| Number | Country | Date |
|---|---|---|
| 548,267 | Great Britain | Oct. 2, 1942 |